(12) United States Patent
Alexander et al.

(10) Patent No.: US 10,300,422 B2
(45) Date of Patent: *May 28, 2019

(54) GREASE REMOVAL APPARATUS, SYSTEMS AND METHODS

(71) Applicant: EFIP HOLDINGS LP, Dunedin (NZ)

(72) Inventors: Glenn David Alexander, Dunedin (NZ); Joseph Anthony Salpietra, Jr., Shreveport, LA (US)

(73) Assignee: EFIP Holdings LP, Dunedin (NZ)

( * ) Notice: Subject to any disclaimer, the term of this patent is extended or adjusted under 35 U.S.C. 154(b) by 56 days.

This patent is subject to a terminal disclaimer.

(21) Appl. No.: 15/005,282

(22) Filed: Jan. 25, 2016

(65) Prior Publication Data

US 2016/0136559 A1 May 19, 2016

Related U.S. Application Data

(63) Continuation of application No. 14/182,080, filed on Feb. 17, 2014, now Pat. No. 9,242,200, which is a
(Continued)

(51) Int. Cl.
*B01D 46/00* (2006.01)
*B01D 46/10* (2006.01)
(Continued)

(52) U.S. Cl.
CPC ........... *B01D 46/10* (2013.01); *B01D 39/163* (2013.01); *B01D 39/1607* (2013.01);
(Continued)

(58) Field of Classification Search
CPC ........ B01D 46/01; B01D 46/10; B01D 46/93; B01D 39/163; B01D 39/1615;
(Continued)

(56) References Cited

U.S. PATENT DOCUMENTS 1,757,690 A 5/1930 Stingberg
2,332,519 A 10/1943 Leonardson et al.
(Continued)

FOREIGN PATENT DOCUMENTS

CA 2262821 A1 2/1998
DE 817302 C1 7/1959
(Continued)

OTHER PUBLICATIONS

European Patent Office, Notification of Transmittal of the International Search Report and the Written Opinion of the International Searching Authority, or the Declaration for International Application No. PCT/US2009/057994, dated Jul. 14, 2010 (counterpart to co-pending U.S. Appl. No. 12/565,892).

(Continued)

*Primary Examiner* — Frank M Lawrence, Jr.
(74) *Attorney, Agent, or Firm* — Baker Botts L.L.P.

(57) ABSTRACT

A filter assembly includes a filter pad comprising fibers including natural, synthetic and/or hybrid fibers. A stabilizer frame formed of a non-metallic material may be imbedded in the filter pad. The stabilizer frame may be configured to provide support to the filter pad to maintain the filter pad in a generally flat configuration. In accordance with a particular embodiment, the filter pad may be comprised of at least first and second fibrous mats that are coupled together. In this embodiment, the stabilizer frame may be disposed between and coupled with the first and second fibrous mats.

20 Claims, 2 Drawing Sheets

Related U.S. Application Data continuation of application No. 13/614,639, filed on Sep. 13, 2012, now Pat. No. 8,652,241, which is a continuation of application No. 12/430,650, filed on Apr. 27, 2009, now Pat. No. 8,277,530.

(60) Provisional application No. 61/099,699, filed on Sep. 24, 2008.

(51) Int. Cl.
| | |
|---|---|
| *B01D 39/16* | (2006.01) |
| *D04H 1/04* | (2012.01) |
| *D04H 1/48* | (2012.01) |
| *F24C 15/20* | (2006.01) |
| *B23P 11/00* | (2006.01) |

(52) U.S. Cl.
CPC ..... *B01D 39/1615* (2013.01); *B01D 46/0001* (2013.01); *B01D 46/0093* (2013.01); *B23P 11/00* (2013.01); *D04H 1/04* (2013.01); *D04H 1/48* (2013.01); *F24C 15/2035* (2013.01); *B01D 2239/065* (2013.01); *Y10T 29/49* (2015.01); *Y10T 29/49826* (2015.01); *Y10T 29/49885* (2015.01)

(58) Field of Classification Search
CPC ............ B01D 46/0001; B01D 46/0093; B01D 39/1607; B01D 2239/065; B23P 11/00; D04H 1/04; D04H 1/48; F24C 15/2035; Y10T 29/49; Y10T 29/49826; Y10T 29/49885
USPC ................... 55/527, 528, 490, 492, DIG. 36
See application file for complete search history.

(56) References Cited

U.S. PATENT DOCUMENTS

| | | | |
|---|---|---|---|
| 2,664,172 A | 12/1953 | Butterfield | |
| 2,809,715 A | 10/1957 | Lemkey | |
| 3,015,367 A | 1/1962 | Smith et al. | |
| 3,158,532 A | 11/1964 | Pall et al. | |
| 3,388,536 A | 6/1968 | Nash | |
| 3,660,969 A | 5/1972 | Fox | |
| 3,707,385 A | 12/1972 | Kraemer | |
| 3,865,193 A | 2/1975 | Hall | |
| 3,925,137 A | 12/1975 | Kamei | |
| 4,105,423 A * | 8/1978 | Latakas ............. | B01D 46/0002 55/501 |
| 4,277,267 A | 7/1981 | Posner | |
| 4,336,038 A | 6/1982 | Schultheiss et al. | |
| 4,350,504 A * | 9/1982 | Diachuk ............. | B01D 50/002 126/299 C |
| 4,433,020 A | 2/1984 | Narukawa et al. | |
| 4,455,237 A | 6/1984 | Kinsley | |
| 4,517,308 A | 5/1985 | Ehlenz et al. | |
| 4,658,755 A * | 4/1987 | Bernard ............. | B01D 17/0202 118/610 |
| 4,689,058 A | 8/1987 | Vogt et al. | |
| 4,883,507 A | 11/1989 | Rey et al. | |
| 5,187,006 A | 2/1993 | Leighton | |
| 5,273,565 A | 12/1993 | Milligan et al. | |
| 5,417,752 A | 5/1995 | Paren et al. | |
| 5,470,365 A | 11/1995 | Jang | |
| 5,512,073 A | 4/1996 | Mirza et al. | |
| 5,635,005 A | 6/1997 | Saitoh et al. | |
| 5,707,411 A | 1/1998 | Rodaway et al. | |
| 5,935,303 A * | 8/1999 | Kimura ............. | B01D 39/1615 264/441 |
| 5,972,091 A | 10/1999 | Giesfeldt et al. | |
| 6,009,901 A | 8/2000 | Cronia et al. | |
| 6,293,983 B1 | 9/2001 | More | |
| 6,389,832 B1 | 5/2002 | Wu | |
| 6,468,323 B1 | 10/2002 | Chwala | |
| 6,918,940 B1 | 7/2005 | Lackey et al. | |
| 7,338,702 B2 | 3/2008 | Swales et al. | |
| 7,465,332 B2 | 12/2008 | Randinelli | |
| 8,277,530 B2 * | 10/2012 | Alexander ......... | B01D 39/1615 55/492 |
| 8,652,241 B2 | 2/2014 | Alexander et al. | |
| 9,242,200 B2 * | 1/2016 | Alexander ......... | B01D 39/1615 |
| 2003/0017129 A1 | 1/2003 | Maleeny et al. | |
| 2004/0096629 A1 | 5/2004 | Aneja et al. | |
| 2004/0116026 A1 | 6/2004 | Kubose et al. | |
| 2004/0116028 A1 | 6/2004 | Bryner | |
| 2004/0121114 A1 * | 6/2004 | Piana .................... | D06M 11/82 428/85 |
| 2004/0177598 A1 | 9/2004 | Bohacik | |
| 2005/0028498 A1 * | 2/2005 | Entezarian ........... | B01D 50/002 55/320 |
| 2005/0118919 A1 | 6/2005 | Link et al. | |
| 2006/0042020 A1 | 3/2006 | Salmon et al. | |
| 2006/0150339 A1 | 7/2006 | McGuire et al. | |
| 2006/0228528 A1 | 10/2006 | Link et al. | |
| 2006/0231487 A1 | 10/2006 | Bartley et al. | |
| 2006/0286884 A1 | 12/2006 | Thioliere et al. | |
| 2007/0023349 A1 | 2/2007 | Kylloenen et al. | |
| 2007/0084786 A1 | 4/2007 | Smithies | |
| 2007/0178788 A1 | 8/2007 | Link et al. | |
| 2007/0245703 A1 | 10/2007 | Randinelli et al. | |
| 2008/0022645 A1 | 1/2008 | Skirius et al. | |
| 2009/0030131 A1 | 1/2009 | Fushitani et al. | |
| 2015/0128804 A1 | 5/2015 | Salpietra | |

FOREIGN PATENT DOCUMENTS

| | | |
|---|---|---|
| DE | 8022263 | 2/1981 |
| DE | 89 05 395.8 U1 | 6/1989 |
| DE | 60221829 | 5/2008 |
| EP | 1762655 A1 | 3/2007 |
| EP | 1826493 A2 | 8/2007 |
| EP | 1861524 A2 | 12/2007 |
| GB | 572899 A | 10/1945 |
| GB | 818943 A | 8/1959 |
| GB | 818948 A | 8/1959 |
| GB | 822175 A | 10/1959 |
| GB | 1401231 A | 7/1975 |
| GB | 2290727 A | 1/1996 |
| JP | S61220711 | 10/1986 |
| JP | 2001234902 A | 8/2001 |
| JP | 2011-234902 A | 11/2011 |
| WO | 98/45021 A1 | 10/1998 |
| WO | 2007/023777 A1 | 3/2007 |
| WO | 2007/140302 A2 | 12/2007 |
| WO | W02007140302 A2 | 12/2007 |
| WO | 2008/103736 A1 | 8/2008 |

OTHER PUBLICATIONS

Intellectual Property Office of New Zealand; Examination Report issued in Patent Application No. 591766, dated Mar. 27, 2012.
European Patent Office, International Search Report for International Application No. PCT/US2009/058186, dated Feb. 24, 2010 (counterpart to co-pending U.S. Appl. No. 12/565,582).
European Patent Office, International Search Report for International Application No. PCT/US2009/058183, dated Feb. 5, 2010 (counterpart to co-pending U.S. Appl. No. 12/565,592).
European Patent Office, Form PCT/ISA/237, Written Opinion of the International Searching Authority for Application No. PCT/US2009/058183, dated Feb. 5, 2010.
European Patent Office, International Search Report for PCT/U52014/042381, dated Jun. 30, 2015.
European Patent Office, Written Opinion of the International Searching Authority for Application No. US2014/042381, dated Jun. 30, 2015.
Japan Patent Office; Notice of Reasons for Rejection, for Japanese Patent Application No. 2011-529178, Date of Draft: Jun. 10, 2013; dated Jun. 18, 2013.
United States Patent and Trademark Office, Non-Final Office Action in related U.S. Appl. No. 12/565,582, dated Mar. 11, 2011.

(56) References Cited

OTHER PUBLICATIONS

United States Patent and Trademark Office, Final Office Action in related U.S. Appl. No. 15/565,582, dated Sep. 15, 2011.
United States Patent and Trademark Office, Advisory Action in related U.S. Appl. No. 12/565,582, dated Nov. 21, 2011.
United States Patent and Trademark Office, Non-Final Office Action in related U.S. Appl. No. 12/565,582, dated Jan. 15, 2013.
United States Patent and Trademark Office, Final Office Action in related U.S. Appl. No. 12/565,582, dated Jul. 10, 2013.
United States Patent and Trademark Office, Non-Final Office Action in related U.S. Appl. No. 12/565,592, dated Mar. 11, 2011.
United States Patent and Trademark Office, Final Office Action in related U.S. Appl. No. 12/565,592, dated Sep. 13, 2011.
United States Patent and Trademark Office, Advisory Action in related U.S. Appl. No. 12/565,592, dated Nov. 25, 2011.
United States Patent and Trademark Office, Non-Final Office Action in related U.S. Appl. No. 12/565,592, dated Jan. 14, 2013.
United States Patent and Trademark Office, Final Office Action in related U.S. Appl. No. 12/565,592, dated Jul. 1, 2013.
European Patent Office, Invitation to Pay Additional Fees and, where applicable, Protest Fee for International Application No. PCT/US2009/057994, dated Feb. 19, 2010 (counterpart to co-pending U.S. Appl. No. 12/565,592).
European Patent Office, Communication Pursuant to Article 94(3) EPC for Application No. EP 09 792 886.5, dated Feb. 5, 2016.
S. J. Russell, "Handbook of Nonwovens," Woodhead Publishing in Textiles, 2007.
Canadian Intellectual Property Office, Office Action for Application No. 2,737,789, dated Feb. 26, 2016.
European Patent Office, Form PCT/ISA/237, Written Opinion of the International Searching Authority for Application No. PCT/US2009/058186, dated Feb. 24, 2010.
United States Patent and Trademark Office, Advisory Action in related U.S. Appl. No. 12/565,592, dated Nov. 12, 2013.
United States Patent and Trademark Office, Non-Final Office Action in related U.S. Appl. No. 12/565,592, dated Nov. 14, 2014.
United States Patent and Trademark Office, Final Office Action in U.S. Appl. No. 12/565,592, dated Mar. 25, 2015.
United States Patent and Trademark Office, Advisory Action in related U.S. Appl. No. 12/565,592, dated Sep. 4, 2015.
United States Patent and Trademark Office, Notice of Allowance in related U.S. Appl. No. 12/565,592, dated Sep. 4, 2014.
United States Patent and Trademark Office, Requirement for Restriction/Election in related U.S. Appl. No. 14/304,765, dated Sep. 3, 2015.
United States Patent and Trademark Office, Non-Final Office Action in related U.S. Appl. No. 14/304,765, dated Oct. 21, 2015.
United States Patent and Trademark Office, Non-Final Office Action in related U.S. Appl. No. 12/565,582, dated Dec. 22, 2015.
United States Patent and Trademark Office, Advisory Action in related U.S. Appl. No. 12/565,582, dated Oct. 22, 2013.
United States Patent and Trademark Office, Non-Final Office Action in related U.S. Appl. No. 12/565,582, dated Oct. 22, 2013.
United States Patent and Trademark Office, Non-Final Office Action in related U.S. Appl. No. 12/565,582, dated Nov. 14, 2014.
United States Patent and Trademark Office, Final Office Action in related U.S. Appl. No. 12/565,582, dated Mar. 25, 2015.
Intellectual Property India Search Report in Indian Application No. 2710/DELNP/2011, dated Mar. 28, 2018, 8 pages.
European Patent Office Extended Search Report in EP Application No. 17190107.7-1009/3315184 dated May 7, 2018, 9 pages.
Communication pursuant to Article 94(3) EPC, Examination Report in Application No. 17 190 107.7-1009, dated Feb. 25, 2019.
Canadian Office Action in Application No. 2,977,098, dated Mar. 5, 2019.

* cited by examiner

GREASE REMOVAL APPARATUS, SYSTEMS AND METHODS

RELATED APPLICATIONS

This application is a continuation of U.S. patent application Ser. No. 14/182,080, filed on Feb. 17, 2014, which is a Continuation of U.S. patent application Ser. No. 13/614,639, filed on Sep. 13, 2012, now issued as U.S. Pat. No. 8,652,241 B2, which is a continuation of U.S. patent application Ser. No. 12/430,650, filed on Apr. 27, 2009, now issued as U.S. Pat. No. 8,277,530B2, which claims benefit of U.S. Provisional Patent Application Ser. No. 61/099,699, entitled Disposable Grease Filter Apparatus and Method, and filed on Sep. 24, 2008, the entire contents of each of which are hereby incorporated by reference.

TECHNICAL FIELD

The teachings of the present disclosure relate to the field of exhaust filtration in ventilation systems and more particularly, to grease removal apparatus, systems and methods.

BACKGROUND

In kitchens, the grease filters and/or grease removal devices are usually installed in exhaust hoods above various types of cooking equipment including deep-fat fryers, grills, griddles and ovens where excess heat and flame can occur. In applications using existing wool or fiber-based filters (see e.g., U.S. Pat. No. 6,293,983) problems may be encountered due to excessive heat or flame. Unless stainless steel heat shields are placed in front of the wool filters, there is the possibility that concentrations of heat (e.g., from exhaust of the cooking equipment) may degrade the wool fibers and cause a hole to form in the filter. Similarly, flames may make holes in the filter if they come in direct contact with the filter which can happen above griddles and grills with a grease flare-up. This is a major draw-back as a hole in the filter renders it ineffective and requires that the filter be replaced.

When selecting the thickness of a wool filter, there is a tradeoff between airflow and grease collection. A thin filter will allow sufficient airflow but will not have a large capacity to collect and store grease. A thicker filter will allow for greater grease collection but reduce airflow. Existing filters of a thickness selected to allow sufficient airflow may not have a large capacity to catch and store grease. This renders the wool filter expensive to use as it needs to be changed very frequently, and it is also operationally inconvenient to change on a regular basis.

Additionally, existing wool filters often require a separate support frame and frame cover made of metal, which is both costly, heavy for the operator to use and susceptible to damage, often requiring costly replacement. This assembly, and often along with an optional heat shield means the current wool-based system is not only expensive to make but more significantly it can be difficult for the user to operate. As a result, operational use has been limited in the marketplace. There is room for simplification and improvement of this assembly.

The following narrative is provided to give background related to the purpose, theory and operation of kitchen exhaust hoods.

Kitchen Exhaust Hoods

Commercial and institutional cooking establishments typically employ exhaust removal systems to provide ventilation of the workspace, thus supporting the kitchen operation with the removal of heat, grease laden vapor, smoke, contaminants, and cooking by-product. The primary device utilized in the exhaust system for the purpose of capturing the plume produced by the cooking appliances, containing fire, and reducing the contaminants entering the exhaust system is the exhaust hood.

The heating of cooking appliances generally results in a natural upward draft of air, which rises from the cooking battery. At the point where food is being heated and cooked, the updraft or plume, also known as effluent, becomes entrained into the air stream rising from the cooking surface. This by-product will be produced at varying rates based on the surface temperature of the cooking appliances, and the type of foods being prepared. With cooking processes ranging from low to high temperatures, and vast differences in the grease content of the foods being prepared, the need exists to provide adequate ventilation of the workspace, contaminant removal, and fire prevention based on the severity of the cooking operation.

Non-Grease Versus Grease Type Hoods

Two basic types of hoods are commonly utilized for ventilation purposes within commercial and institutional kitchen facilities, with the main factor of their division being whether they are designed to ventilate grease-laden vapor or simply heat and vapor. These are divided into type 1, (commonly referred to as class 1), constructed and designed for the venting of grease laden vapor, and type 2, (or class 2), for the venting of heat, vapor, and odor only.

Since the teachings of the present disclosure includes to the capture of grease particulates from grease laden vapor, further discussion will focus primarily upon Class 1 hoods.

Class 1 Exhaust Hoods

Cooking applications which produce grease-laden vapor typically require the use of class 1 hoods, which will be divided into two main groups; listed exhaust hoods, and unlisted hoods.

Listed exhaust hoods have been tested for performance by a third party Listing Authority, such as Intertek/ETL or Underwriters Laboratories, for their performance in capturing smoke and vapor at varying temperatures, ability to withstand fire conditions, and electrical components survivability in the application.

Grease Removal Devices

Listed and unlisted exhaust hoods, which are used in cooking applications, will include grease removal devices to reduce the grease volume of the exhaust air stream prior to the exhaust air entering the exhaust duct. Grease buildup in the exhaust ductwork is considered a fire hazard since the deposited by-product remains flammable. With the accelerated air velocities within the exhaust ductwork induced by the blower, potential risks escalate with the buildup of flammable byproduct. Failure to remove this byproduct at the source of the grease removal device within the hood may result in migration of the flammable load throughout the exhaust duct system.

Grease removal apparatus and systems are normally located within the exhaust hood, and may be either removable for cleaning, or may be a fixed component within the exhaust hood for automatic wash down, such as a water wash type hood. Removable type filters are normally arranged within a filter rack, are located just below the exhaust duct collar for the hood, and typically have a metal grease collection container, which does not typically exceed one gallon.

Baffle Filters

Most common filter hoods today utilize baffle type filters, which operate based upon the principle of centrifugal grease extraction. These filters are configured with a series of overlapping baffles, which force the grease laden exhaust air to make several changes in direction within the grease filter. The grease is dismissed from the air stream by centrifugal force, held within the filter interior, and accumulation of the grease aerosol particles which begin to liquefy continuously drain from the filter to a grease drip tray, or trough, and then drain into a metal container which does not typically exceed one gallon.

Baffle filters operate with among the lowest resistance offered by any grease removal device, which may be between 0.50" and 0.75" static pressure, and the average air velocity at the face of the filter may be between 150 feet per minute, and 400 feet per minute, both depending upon the hood airflow in volume.

Baffle filters are listed to Underwriters Laboratories ("UL") Standard 1046, which tests their ability to perform in the application, and in fire conditions. However, UL Standard 1046 does not adequately address the effectiveness of the baffle to actually remove grease from the air flow and prevent it from entering the exhaust duct. As a result, most baffles are very poor at removing grease from the airflow.

Grease in the ducting constitutes a major fire hazard as duct fires are a constant concern in commercial kitchen exhaust systems.

SUMMARY

The teachings of the present disclosure are directed to grease removal apparatus, systems and methods. In accordance with a particular embodiment, the present disclosure provides for a filter assembly that includes a filter pad comprising fibers including natural, synthetic and/or hybrid fibers. A stabilizer frame may be imbedded in the filter pad. In a particular embodiment, the stabilizer frame may be formed of a nonmetallic material. The stabilizer frame is configured to provide support to the filter pad to maintain the filter pad in a generally flat configuration. In accordance with a particular embodiment, the filter pad may be comprised of at least first and second fibrous mats being coupled together, and the stabilizer is disposed between and coupled with the first and second fibrous mats.

In accordance with an alternative embodiment of the present disclosure, the filter pad may be formed from a single fibrous mat that is coupled with a stabilizer. In accordance with this embodiment, each of four edges of the mat are lapped over respective edges of the stabilizer frame.

In accordance with yet another embodiment of the present disclosure, the blend of fibers may include synthetic fibers and/or viscose fibers. In some embodiments, at least a portion of the fibers may be treated with a solution that is fire resistant or fire retardant.

A technical advantage of particular embodiments of the present disclosure includes a filter assembly that is effective at removing or reducing grease particulates from grease laden air. Accordingly, baffle filters may remain cleaner for a longer period of time, thereby being an even more effective fire barrier since the fuel source (e.g., grease particulates) has been decreased from the airflow prior to reaching any baffle filters and/or ductwork.

Another technical advantage of particular embodiments of the present disclosure includes a filter assembly that distributes flame more evenly across a baffle filter, when the filter assembly is located "upstream" from a baffle filter. Accordingly, baffle filters are protected from fire and damage, perform better, and remain cleaner for a longer period of time.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE EMBODIMENTS

The present disclosure is directed to grease removal apparatus, systems and methods. A particular embodiment of the present disclosure includes a filter assembly that may be referred to herein as a Disposable Grease Removal Device ("DGRD"), and may be used in, for example, kitchen exhaust systems. In particular embodiments, the DGRD may be formed of materials such that it is generally "self-supporting", meaning that it does not require metal filter support frames, frame covers or heat shields. The DGRD can be formed in a variety of ways using a variety of materials that may result in a DGRD that is either reusable or disposable. In such embodiments, the DGRD can be easily mounted in the exhaust hoods by simply sliding it into place on brackets or some other similar fastening or support system within the exhaust hood.

Figure 1:
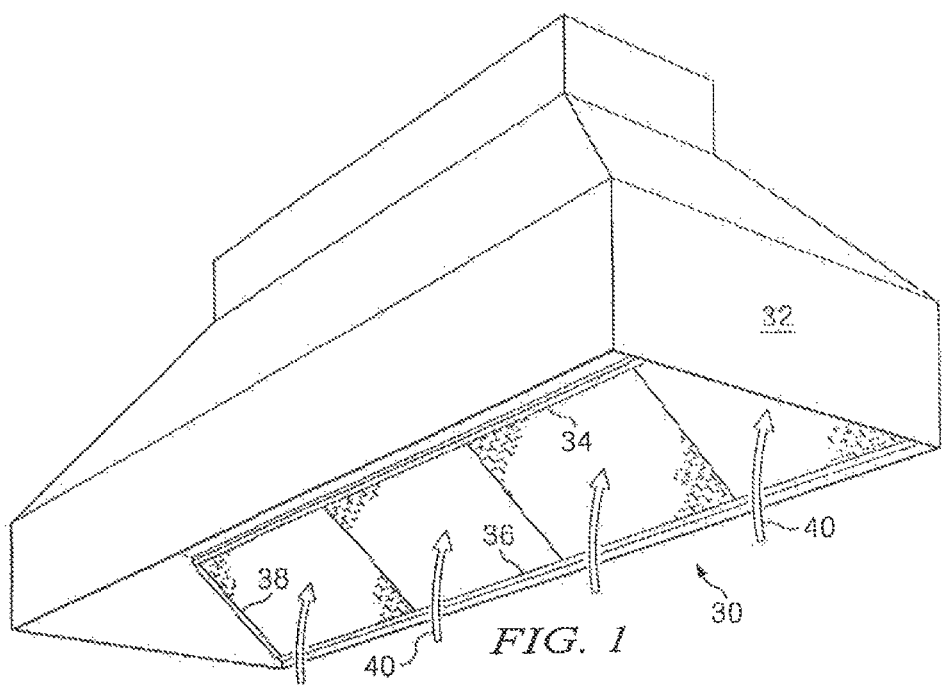
FIG. 1 illustrates a filter assembly, in accordance with a particular embodiment of the present disclosure, installed within a vent hood.
Figure 2:
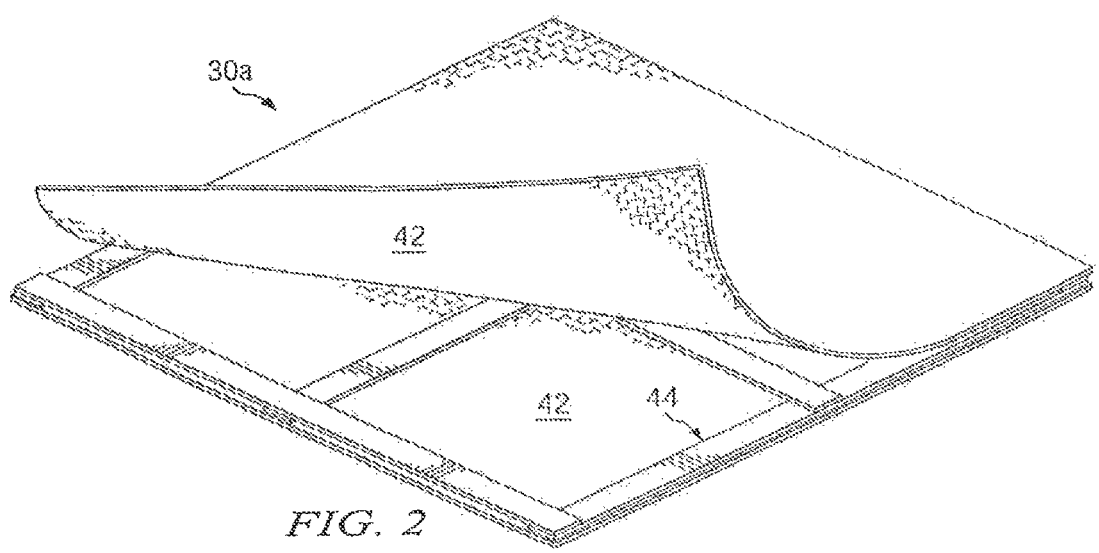
FIG. 2 illustrates a disposable grease removal device, in accordance with a particular embodiment of the present disclosure.
Figure 3:
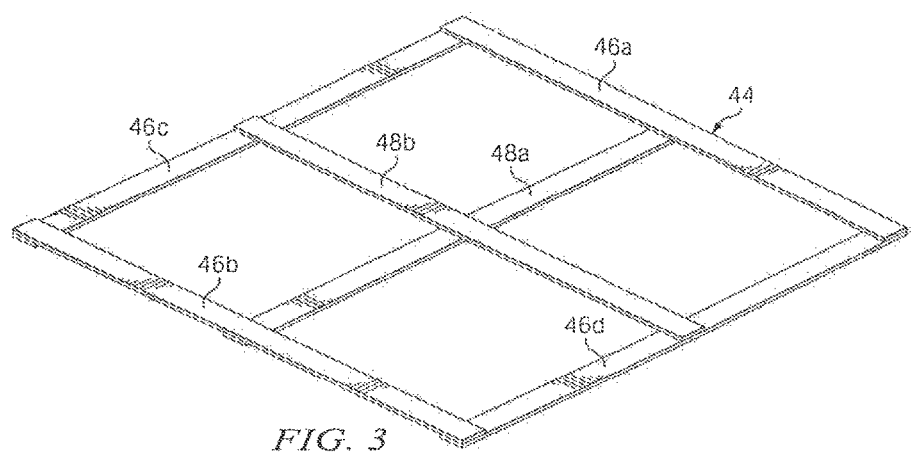
FIG. 3 illustrates a stabilizer that may be a part of the grease removal device of FIG. 2, in accordance with a particular embodiment of the present disclosure.

FIGS. 1-3 illustrate a particular embodiment DGRD 30, in more detail. DGRD 30 is installed within a vent hood 32. Vent hood 32 is configured and positioned such that air leaving a cooking area will pass through DGRD 30 before being exposed to (i) a baffle filter (not shown in FIG. 1) that may be positioned behind DGRD 30; and/or (ii) ductwork associated with vent hood 32 that is configured to remove the air from the cooking area (with or without an associated exhaust fan(s)). Vent hood 32 includes top and bottom filter clips 34 and 36, respectively, and side clips 38 that collectively secure a plurality of DGRDs 30 in place, and allow for simplified removal and/or replacement of DGRDs 30. A plurality of direction arrows 40 are provided in FIG. 1 to illustrate the direction of air flow.

The DGRD 30 includes two primary components, either or both of which may be formed from materials that allow for disposal of the DGRD after a single use: 1) a filter pad 42 that may be referred to herein as a grease collector pad, and 2) an internal stabilizer frame 44.

The grease collector pad 42 is one of the primary mechanisms that will capture and remove the grease particulates from the airflow. The fibers which make up the grease collector pad 42 are capable of collecting and holding grease particulates from the air that travels through the grease collector pad 42. In particular embodiments, the grease collector pad 42 may be formed principally from a mixture of flame resistant viscose fibers and wool fibers that are woven together, and bonded together with a bonding emulsion that may contain additional additives such as fire retardant, fire suppressant, anti-microbial, anti-bacterial, color dyes, etc.

The internal stabilizer frame 44 is designed to add structure and rigidity to the grease removal device. In the embodiment of FIG. 3, the internal stabilizer frame has four sides 46 (top 46a, bottom 46b, left 46c and right 46d), vertical support 48a, and horizontal support 48b. In a particular embodiment, supports 48a and 48b may be approximately ¾" wide and approximately 0.125" thick. In another embodiment, the internal stabilizer frame 44 may also be made of practically any non-metallic material, for example a natural, bio-degradable material that is lightweight and flame-resistant. The internal stabilizer frame 44 could be made of practically any material that will pass any required regulatory codes. The stabilizer frame may also include any number of horizontal, vertical and/or diagonal supports of practically any size or configuration. Functionally, it is beneficial for the internal stabilizer frame 44 to add shape and structure to the DGRD with relatively little added weight and/or very little added static pressure.

The DGRD of FIG. 2 is generally formed by inserting the internal stabilizer frame 44 within or between two grease collector pads 42. In a particular embodiment, the internal stabilizer frame 44 may be coated with glue on both sides, which allows the internal stabilizer frame 44 and the grease collector pad 42 to be merged together into a single DGRD.

The DGRD can be manufactured using a variety of processes and alternative materials. Included herein is a description of various details related to how the two primary components of the DGRD can be produced. The two primary components noted above are the grease collector pad 42 and the internal stabilizer frame 44.

Figure 4:
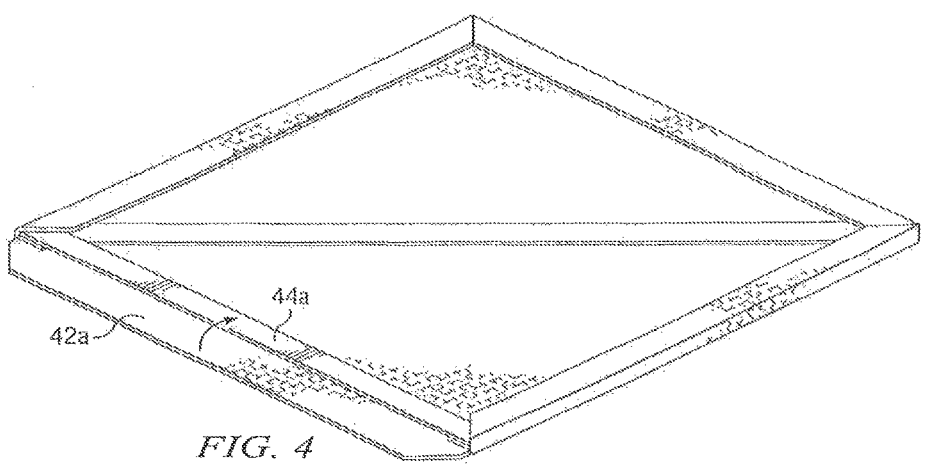
FIG. 4 illustrates an alternative embodiment disposable grease removal device.

FIG. 4 illustrates a DGRD 30a, in accordance with another embodiment of the present disclosure. DGRD 30a includes a grease collector pad 42a and an internal stabilizer frame 44a, that are similar to grease collector pad 42 and internal stabilizer frame 44 of FIG. 2. However, the method for manufacturing DGRD 30a would be slightly different. DGRD 30a is formed using a single grease collector pad 42a that is big enough to overlap internal stabilizer frame 44. Thus, at each edge of the internal stabilizer 44a, the grease collector pad is lapped over the internal stabilizer frame 44a. An optional diagonal support 46e is also included on the internal stabilizer frame.

Figure 5:
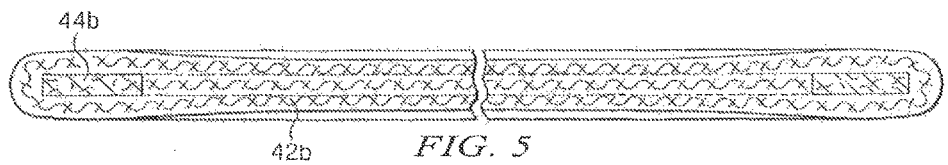
FIG. 5 illustrates a cross-section of yet another alternative embodiment disposable grease removal device.

FIG. 5 illustrates yet another DGRD 30b, in accordance with yet another embodiment of the present disclosure. DGRD 30b includes a single grease collector pad 42b. An internal stabilizer frame 44b is embedded within grease collector pad 42b, which is simply woven around internal stabilizer frame 44b to manufacture DGRD 30b.

Grease Collector Pad

The grease collector pads of this disclosure can be manufactured using one or more (e.g., a blend) of various fibers. For example, at least three different types of fibers may be used: (i) natural fibers, (ii) synthetic fibers, and/or (iii) hybrid fibers. For the purposes of this disclosure, "natural" fibers generally refers to fibers that are derived from nature and include wool (e.g., sheep's wool or any other animal hair), cotton, linen, hemp, manila, flax, plant fibers, jute sisal, etc. For the purposes of this disclosure, "synthetic" fibers generally refers to fibers that are man-made, and include nylon, polyester, acrylic, polypropylene, polyethylene, polystyrene, flame resistant modified acrylic, etc. For the purposes of this disclosure, "hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. Most of the above referenced fibers may also be used in a flame resistant form in which a flame resistant additive is impregnated into the fibers.

One particular embodiment of the present disclosure is a mixture of wool fibers and flame resistant viscose fibers. The blended fibers may be sprayed with a bonding emulsion that may be selected such that it is biodegradable. In various embodiments, the bonding emulsion may contain fire-resistant, fire-retardant and/or fire-suppressant ingredients, anti-microbial agents and a color dye mixed with it in any combination.

The grease collector pads may also be made using wool and flame resistant viscose blended in any ratio. For example, the ratio could be as much as 95% wool and 5% flame resistant viscose or as much as 95% flame resistant viscose and 5% wool. In general, practically any ratio of the blended flame resistant viscose and wool may be employed, within the teachings of the present disclosure. In other embodiments, the ratio could also be 100% flame resistant viscose or 100% wool fibers.

For example, the following describes blends that may be used in accordance with particular embodiments of the present disclosure:
- 50% wool and 50% 8-9 denier flame resistant viscose bonded with biodegradable flame resistant treated acrylic bonding emulsion (for purposes of this specification, "denier" is a unit of measurement of linear density of textile fiber mass, calculated as one gram per nine-thousand meters).
- 100% 8-9 denier flame resistant viscose bonded with biodegradable flame resistant treated acrylic bonding emulsion.
- 50% wool/25% 8-9 denier flame resistant viscose/25% 2 denier flame resistant viscose bonded with biodegradable flame resistant treated acrylic bonding emulsion.

In other embodiments, the viscose and/or flame resistant viscose may be provided within a range of 2-9 denier, or within a narrower range of 4-8 denier. In particular embodiments, it may be provided at 5 denier.

In addition, the wool or flame resistant viscose could be blended with other fibers that are natural, synthetic and/or hybrid fibers, which can impart flame resistant or structural properties to the resultant apparatus. This could include rayon, flame resistant rayon, flame resistant modified acrylic, PLA flame resistant polymers, biodegradable flame resistant polymers, plant fibers or flame resistant natural fibers derived from plant fibers i.e. jute, flax, hemp, sisal, cotton, manila. In accordance with another embodiment, wool and viscose may be blended in any percentage then treated with a fire retardant that would impart fire retardant properties to the wool and viscose blend. This could also be a blend of any natural or synthetic fibers blended in any percentage which could be treated with a flame resistant compound to make the overall blend flame resistant.

In accordance with a particular embodiment, the wool/flame resistant viscose may be treated with flame retardant and/or flame suppressant compounds to improve the heat and flame resistance of the resulting pad. Alternatively, the process may omit flame resistant and/or flame suppressant treatment as it is determined by testing of the various blends to heat and flame for a particular application.

The flame resistant viscose fiber is relatively heat and flame resistant and will only degrade under extreme conditions of heat and flame. For this reason, flame resistant viscose fibers are used extensively in clothing for firemen, welders, military and others that are exposed to severe heat and/or flame. This may be important given that the DGRD is often installed above deep-fat fryers, grills, griddles and ovens in the kitchen where excess heat and flame can occur. Flame resistant viscose fibers being blended into the grease collector pad 42 may significantly improve heat and flame resistance properties of the DGRD.

While wool is naturally flame resistant, in an open structure the wool fibers may be exposed to higher concentrations of oxygen in certain conditions. For this reason, a flame retardant and/or fire suppressant may be applied in accordance with particular embodiments. However, with the flame resistant viscose or other similar fiber it may not be required, or may be required in smaller concentration, depending on the planned application.

Flame resistant viscose fibers capture grease and contaminants from grease laden vapor. Therefore, when used in combination with wool fibers there is very similar grease capturing ability, but, with the added benefit of more robust performance against heat and flame.

In accordance with particular embodiments of this disclosure, the bonding emulsion may be used to provide a way to apply the fire-retardant/suppressant compounds or any other additives such as color dyes, anti-bacterial, antimicrobials, etc. The bonding emulsion may also be used to bond the blended fibers together in the desired shape. The bonding emulsion may be designed so that it will break down over time when the DGRD is disposed of after use (i.e., is biodegradable).

Wool fibers are bio-degradable and the flame resistant viscose fibers may be made from wood pulp and/or in such a way that it is 100% bio-degradable. Hence, the resulting grease collector pad 42 using this blend of material and bonding emulsion may be fully biodegradable and as such can be easily disposed of without effecting the environment.

The bonding emulsion, in particular embodiments, is made from biodegradable components comprising a blend of acrylic co-polymers. It may also be made with other natural occurring and biodegradable binders such as starch and protein adhesives. Synthetic bonding components which have biodegradable properties including, but not limited to, PLA (Polylactic acid) may also be used. Ultra-sound and/or Hydrogen-bonding may also be a used as a bonding method.

In accordance with a particular embodiment, the grease collector pad 42 may be formed from a 50% blend of fire-resistant 5-denier×64 mm flame resistant viscose and 50% of fibers comprised of 100% lamb's wool. The lamb's wool may be clean, scoured 28 micron wool in 1 to 3 inch lengths. A single grease collector pad 42 in this embodiment may have a weight of approximately 100 grams per square meter and a loft of approximately 8 mm.

Following is a discussion of various manufacturing processes that could be used to produce the grease collector pad 42, in accordance with particular embodiments of the present disclosure.

The scoured wool may be "opened" to enable easier processing. The wool may then be blended with the flame resistant viscose or similar fiber as a pre-blend, and transferred to be put through a non-woven carding machine which further opens and generally aligns the blended fibers. The card may be used to make the fiber blend into a fiber web which may then be layered using a cross lapping machine into a blended fiber wadding. If a grid or mesh was to be introduced it would feed into the blend at the cross lapper of a roll. The lapping and carding may be used to ensure the fibers are aligned correctly so that when the fiber wadding is sprayed with binder that the final grease collector pad 42 will have sufficient, predetermined minimum loft.

The wool/flame resistant viscose blend may also be needle punched into a non-woven blanket. Other non-woven process such as needling, thermo-bonding, ultra-sound, air laid, spun bond or other non woven technology may be used to form the wadding/blanket.

At this stage the bonding emulsion may be applied by spraying the top and the bottom of the wadding with the spray mix. The emulsion is applied in a diluted form to allow penetration through the wadding. Vacuum is applied below the wadding to further assist the penetration of the fiber with the bonding emulsion. The bonding emulsion may be used to apply the other additives such as fire retardants, fire suppressants, anti-microbial agents, anti-bacterial agents, color dyes, etc. so the solution should be applied relatively evenly and in the correct, predetermined proportions.

As the thickness of the wadding and grams per square meter can vary, the amount of bonding emulsion will also vary, so that it matches what is desired to sufficiently bond the grease collector pad 42 and impart the desired physical and fire resistant properties.

The spray bonded wadding may then be passed through an oven at over 280 F to drive off the water and cure the bonding resins. The resultant wadding may then be rolled into rolls and allowed 24 hours to cure and the binder to be fully effective. During this time the wool absorbs moisture from the atmosphere. The resultant wadding may then be made into rolls cut at specific widths and lengths.

The grease collector pad 42 media could be made as a flat sheet or it could be folded into pleats. The use of pleats may provide additional capture capacity due to the pleats resulting in more surface area for capacity available within the same area.

Internal Stabilizer Frame

One function of the internal stabilizer frame is to provide dimensional structure and rigidity to the DGRD. The internal stabilizer frame, in a particular embodiment, may be made from fire-resistant fiberboard (e.g., that is 0.125" thick) and can be either die-cut or cut into individual strips and assembled into the required shape, and may include any combination of diagonal, vertical or horizontal support members. Alternative materials may also be non-woven 100% flame resistant viscose fibers which have been needle punched so that it has the consistency of thick cardboard and as such can be used to make the internal stabilizer frame. The flame resistant viscose is flame resistant. The non-woven flame resistant viscose could then be cut into strips and assembled or die-cut into the shape required for each internal stabilizer frame with any combination of vertical, horizontal or diagonal support members.

Other materials that could be used to make the internal stabilizer frame include flame resistant treated jute or Sisal fiber or flame resistant treated plastics and polymers.

Assembly of the DGRD

The DGRD is formed when the grease collector pad and the internal stabilizer frame are merged together to create a single unit. In a particular embodiment the assembly process includes inserting the internal stabilizer frame between two grease collector pads. In particular embodiments, both sides of the internal stabilizer frame may be coated with a glue which results in the components being held firmly together when pressure is applied to the unit to compress the assembly. In the embodiment described above, the DGRD may weigh approximately 250 grams per square meter ("gsm") with a loft of approximately 22-25 mm. In other various embodiments, the DGRD can vary in weight from 50 gsm to 750 gsm. The weight used is a dry mass weight based on the production weight of the grease collector pad when they come off of the production line. The resultant grease collector pad assembly may have a dry loft of 5 mm to 55 mm.

Alternative Embodiments

The DGRD may be made in other shapes and sizes using the same primary ingredients as the embodiments described above. For example, the following is an alternative method of design for the DGRD that may use some or all of the same materials but assembles them with the internal stabilizer frame disposed upon the exterior of the fiber media.

The internal stabilizer frame cartridge or frame panel may be made by using a fire resistant stiff material and die cutting it into a frame with diagonal and/or horizontal support members. The fiber media comprising the wool/flame resistant viscose blanket may be bonded to the inside perimeter of the external frame using glue providing a continuous and positive seal.

The fiber media may be installed as a flat sheet in the enclosure frame or it could be folded into pleats. The pleats may need to be supported with a grid made from any natural or synthetic material which exhibits fire resistant properties. It may also be expanded metal but this has the disadvantage of not being biodegradable. Natural grids or meshes could include flame resistant viscose, flame resistant treated jute or Sisal fiber or flame resistant treated plastics and polymers. The pleats per linear foot would vary depending on the thickness of the fiber media. Alternatively the fiber media could be a flat sheet with no pleats.

Another method to add support to the fiber media would be to include a mesh or grid in the non woven manufacture. The grid or mesh may be inserted in the middle of the wool/flame resistant viscose blend during manufacture. This would mean the fiber blend itself would offer flame resistance and heat protection to any grid or mesh used. So it's possible the grid or mesh used may not need to be flame resistant. The die cut material could be non-woven flame resistant viscose as this has excellent strength and excellent flame and heat resistance. It is also biodegradable. However the die cut material may also be formed from any natural or synthetic material particularly if they have biodegradability and flame resistant properties. Even flame resistant treated cardboard could possibly be used in the manufacture of the die cut support.

The structure and support need not only be die cut. It could be welded supports, or supports fixed to the fiber media directly or injection molded plastic or extruded plastic profiles or any combination of these construction methods. The fiber media could also be made to be more rigid during the manufacturing process by varying the composition of the fibers and the density, varying the non woven by needling or other non woven process or the application and type of bonding emulsion and varying the curing temperature or any combination of these. This could enable the fiber media to be produced into a pleated pad without the need for additional support with an expanded mesh or grid.

The die-cut external internal stabilizer frame may be made from non woven 100% flame resistant viscose which has been needle punched so that it has the consistency of thick cardboard and as such can be used to make the support frame. The flame resistant viscose is flame resistant. The non-woven flame resistant viscose is die cut into the shape required for each grease collector pad with diagonal and horizontal support members. To complete the cartridge up to 2 die cut frames may be required. Effectively a front and back side of the internal stabilizer frame. The wool/flame resistant viscose media may then be cut into the size required to fit the support frame. If the media is to be pleated it will have to be cut to a larger size to allow for the additional requirement due to the pleats. This will vary depending on the number of pleats per linear meter and the depth of the internal stabilizer frame. At this stage, if an extra supporting grid or mesh is required it can be adhered to the fiber media by some type of flame resistant adhesive. Alternatively it could be stitched or sewn in place with flame resistant thread. The die cut support frames are then assembled using flame resistant adhesive ready for the fiber media to be added. The fiber media pack comprising the wool/flame resistant viscose, pleated or not (e.g., flat sheet) which is then bonded with a flame resistant glue to the inside perimeter of the enclosure frame, providing a continuous and positive seal.

The resulting DGRD cassette is then quality inspected and is ready for installation and use. The DGRD may be supplied as panels and cassettes which are ready to install.

The DGRD may then be installed in hoods and exhaust units in kitchens and food preparation areas. The grease collector pad will effectively capture the grease and other contaminants. In some embodiments, the hoods or exhaust hoods will need to have a simple bracket (e.g., Z bracket) or similar installed to support the DGRD.

The cassettes are then placed in the brackets in the hoods in front of the flame baffles. A tool with an extension arm may be used to mount or replace DGRD. Sufficient DGRD's should be installed to cover the hood aperture and the DGRD's may be butted up against each other to form an effective seal.

When one or all of the DGRD's is full of grease, it's a simple matter to remove them and install a replacement.

DGRD Performance

In particular embodiments, the DGRD may have improved performance relative to existing filter systems, in collecting grease in various particulate sizes as per testing that may be done using the ASTM F-2519A standard.

In such embodiments, the DGRD may have larger grease capacity than other fiber filters available and even with the higher grease holding capacity the resulting static pressure increase of the DGRD may be less than other fiber-based filters. This results in kitchen hoods being able to run efficiently without the need to add larger motors. When the DGRD is full it may simply be replaced with a new DGRD and the soiled pad can be disposed of in an environmentally friendly manner. The DGRD may be made in such a way that it can be fully bio-degradable and may breakdown 100% in a landfill in less than 12 months.

Mounting Brackets

Mounting brackets may also be provided as part of the DGRD. They can be formed of practically any material that will support the weight of the DGRD and hold the DGRD firmly in place within the exhaust hood. In accordance with a particular embodiment of the present disclosure, to meet various codes and regulations governing exhaust hoods, the mounting brackets may be comprised of Stainless Steel and/or another non-combustible material. The mounting brackets may be designed to practically any shape to hold the DGRD in place and maintain a sufficient seal within the hood aperture. In particular embodiments of the present disclosure, the mounting brackets may be made of Stainless Steel and formed into the shape of "Z" or "U" to hold the DGRD in place, and allow for simplified removal and/or replacement of DGRDs.

Installation/Removal Tool

An installation/removal tool may also be provided as part of the DGRD System. The installation/removal tool may be used to allow an operator to effectively reach the DGRD when installed within the exhaust hood, without having to climb onto the cooking equipment. The installation/removal tool may be comprised of lightweight aluminum or plastic as the weight of the DGRD does not require a particularly "heavy-duty" material. However, practically any material can be used to make the installation/removal tool that is strong enough to hold the DGRD. The end of the mounting tool includes a plurality of prongs which are used to slightly pierce the front of the DGRD to grab the internal stabilizer frame 44 for lifting and inserting the DGRD into the mounting brackets for installation. For DGRD removal, the prongs on the end of the installation/removal tool are used to pierce completely through grease collector pad 42 and simply lift and remove from the mounting brackets.

The present disclosure is generally directed to a removable and/or disposable grease removal device that is placed between the cooking surface and the baffle filters described herein, to capture grease particulates from grease laden vapors prior to entry into, or "upstream" from the baffle filters described herein. It should be noted that existing grease removal devices are typically located "downstream" of baffle filters.

Although an embodiment of the disclosure has been described using specific terms, such description is for illustrative purposes only. The words used are words of description rather than of limitation. It is to be understood that changes in variations may be made by those of ordinary skill in the art without departing from the spirit and scope of the present disclosure, which is set forth in the following claims. Therefore, the spirit and scope of the appended claims should not be limited to the description of the embodiments disclosed therein.

What is claimed is:

1. A filter assembly for installation within a ventilation hood, comprising:
   a filter pad comprising a combination of wool fibers and viscose fibers and having a thickness and configuration sufficient to allow airflow therethrough and to absorb grease particulates dispersed in the air passing therethrough; and
   a fire-resistant stabilizer frame configured to provide support to the filter pad to maintain the filter pad in a generally flat configuration and to allow installation of the filter pad within the ventilation hood;
   wherein:
     the viscose fibers comprise less than 50% of the filter pad; and
     the filter assembly is located upstream of a baffle filter installed within the ventilation hood.

2. The filter assembly of claim 1, wherein the filter pad is comprised of at least first and second fibrous mats being coupled together, and the stabilizer frame is disposed between and coupled with the first and second fibrous mats.

3. The filter assembly of claim 1, wherein the filter pad is formed from a single fibrous mat that is coupled with the stabilizer frame, and wherein each of four edges of the mat are lapped over respective edges of the stabilizer frame.

4. The filter assembly of claim 1, wherein the viscose fibers comprise 8-9 denier flame resistant viscose bonded with bio-degradable flame resistant treated acrylic bonding emulsion.

5. The filter assembly of claim 1, wherein the viscose fibers are within the range of 4-8 denier.

6. The filter assembly of claim 1, wherein at least a portion of the fibers are treated with a solution that is fire resistant or fire retardant.

7. The filter assembly of claim 1, wherein the filter pad comprises a pleated configuration.

8. The filter assembly of claim 1, wherein the filter pad comprises a bonding emulsion applied to the fibers.

9. The filter assembly of claim 1, wherein the filter assembly has a total dry weight approximately between 210 and 700 grams per square meter.

10. The filter assembly of claim 1, wherein the filter assembly has a dry loft of approximately between 5 mm and 50 mm.

11. A method of manufacture, comprising:
    combining wool fibers and viscose fibers to form a filter pad, wherein:
      the viscose fibers comprise less than 50% of the filter pad; and
      the filter pad has a thickness and configuration sufficient to absorb grease particulates dispersed in the air passing therethrough;
    coupling the filter pad with a stabilizer frame to form a filter assembly, wherein:
      the stabilizer frame is fire resistant and configured to provide support to the filter pad to maintain the filter pad in a generally flat configuration and to allow installation of the filter pad within a ventilation hood.

12. The method of claim 11, wherein the filter pad is comprised of at least first and second fibrous mats being coupled together, and the stabilizer frame is disposed between and coupled with the first and second fibrous mats.

13. The method of claim 11, further comprising applying a bonding emulsion to the fibers.

14. The method of claim 11, wherein the viscose fibers comprise 8-9 denier flame resistant viscose bonded with bio-degradable flame resistant treated acrylic bonding emulsion.

15. The method of claim 11, wherein at least a portion of the fibers are treated with a solution that is fire resistant or fire retardant.

16. The method of claim 11, wherein the filter pad is formed to have a pleated configuration.

17. A filter pad comprising a combination of wool fibers and viscose fibers, the filter pad having a loft sufficient to allow airflow therethrough and the filter pad being configured to absorb grease particulates dispersed in the air passing therethrough, wherein:
    the viscose fibers comprise less than 50% of the filter pad;
    at least a portion of the viscose fibers or the wool fibers are treated with a solution that is fire resistant or fire retardant; and
    the wool fibers and the viscose fibers being bonded together with a bonding emulsion.

18. The filter pad of claim 17, wherein the viscose fibers have a thickness between 2-9 denier.

19. A filter pad comprising a combination of wool fibers and viscose fibers, the filter pad having a loft sufficient to allow airflow therethrough and the filter pad being configured to absorb grease particulates dispersed in the air passing therethrough, wherein:

the viscose fibers comprise more than 50% of the filter pad;

at least a portion of the viscose fibers or the wool fibers are treated with a solution that is fire resistant or fire retardant; and the wool fibers and the viscose fibers being bonded together with a bonding emulsion.

20. The filter pad of claim 19, wherein the viscose fibers have a thickness between 2-9 denier.

* * * * *